United States Patent
Matsuo

(10) Patent No.: US 6,699,583 B1
(45) Date of Patent: Mar. 2, 2004

(54) LATHING METHOD AND APPARATUS, ROUND BAR, LATHING STOCK, AND LATHED PRODUCT

(75) Inventor: Makoto Matsuo, Tokyo (JP)

(73) Assignees: Kabushiki Kaisha Matsuo Kogyo Sho, Tokyo (JP); Nitto Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/281,923

(22) Filed: Mar. 31, 1999

Related U.S. Application Data

(62) Division of application No. 08/998,064, filed on Dec. 24, 1997, now Pat. No. 5,974,920.

(30) Foreign Application Priority Data

Dec. 27, 1996 (JP) ............................................. 8-351472
May 21, 1997 (JP) ............................................. 9-131323

(51) Int. Cl.[7] ..................... B32B 17/00; B32B 15/00; B32B 25/00; B32B 15/04; D02G 3/00
(52) U.S. Cl. ....................... 428/375; 428/385; 428/391; 428/421; 428/450; 428/458; 428/461; 82/127
(58) Field of Search ............................... 428/34.1, 34.4, 428/421, 375, 379, 383, 386, 389, 391, 450, 458, 461; 82/1.11, 42, 110, 126, 127; 29/27 R, 27 C; 414/14; 72/41, 42

(56) References Cited

U.S. PATENT DOCUMENTS

| 4,168,241 A | * | 9/1979 | Kozima et al. ................ 252/18 |
| 4,574,666 A | | 3/1986 | Habegger .................... 82/2.5 |
| 4,638,693 A | * | 1/1987 | Sugimoto .................... 82/2.5 |
| 4,900,579 A | * | 2/1990 | Lee et al. .................... 427/11 |
| 4,995,298 A | | 2/1991 | Arisaka et al. ............... 82/127 |
| 5,058,466 A | * | 10/1991 | Fabbri ......................... 82/126 |
| 5,345,847 A | | 9/1994 | Weller ......................... 82/127 |
| 5,522,689 A | | 6/1996 | Cucchi ........................ 414/14 |
| 5,535,653 A | * | 7/1996 | Berns et al. .................. 82/127 |
| 5,551,324 A | | 9/1996 | Akhmetzyanov et al. ..... 82/1.11 |
| 5,662,014 A | | 9/1997 | Link ............................ 82/125 |
| 5,974,920 A | * | 11/1999 | Matsuo ........................ 82/1.11 |
| 6,088,903 A | * | 7/2000 | Matsuo ........................ 29/558 |
| 6,182,543 B1 | * | 2/2001 | Ito et al. ....................... 82/127 |

FOREIGN PATENT DOCUMENTS

| EP | 596819 B1 | * | 1/1997 |
| JP | 63227699 | | 9/1988 |
| JP | 2-38773 | * | 2/1990 |
| JP | 07009201 | | 1/1995 |

* cited by examiner

*Primary Examiner*—Paul Thibodeau
*Assistant Examiner*—Sheeba Ahmed
(74) *Attorney, Agent, or Firm*—Burns, Doane, Swecker & Mathis, LLP

(57) ABSTRACT

To provide a lathing method and apparatus capable of realizing lathing of a bar member made of a hard cutting material and lathing a stock made of a hard cutting material by a lathe including an NC automatic lathe, although lathing of the hard cutting material is impossible in a conventional case, a round bar is rotatably held to be fed along the longitudinal direction of the round bar by a guide bush fixed on the main body side of the lathing apparatus, and the round bar is sequentially fed from the guide bush to a machining tool arranged on the main body side, thereby lathing the round bar in a cantilevered state. For this purpose, a round bar having a solid lubricant layer having a predetermined thickness on the outer surface of the round bar in advance, thereby lathing the round bar so as to reduce friction. Alternatively, a stock is gripped by the chuck of a lathe which performs turning or a lathing device which performs any other machining in addition to the turning, and the stock is lathed while the outer surface thereof is held to prevent an off-axis error. For this purpose, at least a solid lubricant layer is formed in advance to have a predetermined thickness at a predetermined position where the stock is held to reduce friction. The solid lubricant layer is held in slidable contact with an off-axis preventing device and lathed while preventing the off-axis error.

10 Claims, 12 Drawing Sheets

LATHING METHOD AND APPARATUS, ROUND BAR, LATHING STOCK, AND LATHED PRODUCT

This application is a divisional, of Application Ser. No. 08/998,064, filed Dec. 24, 1997, now U.S. Pat. No. 5,974,920.

BACKGROUND OF THE INVENTION

1. Field of the Invention

The present invention relates to a lathing method and apparatus, a round bar, and a lathed product and, more particularly, to a technique suitable for a so-called CNC automatic lathe (e.g., a guide bush type lathe, and a Swiss-type CNC lathe) for lathing, e.g., a round bar by sequentially feeding the round bar while cantilevering it to be rotatable and fed, unlike lathing in a conventional lathing apparatus in which one end of the round bar is rotatably supported by a lathing chuck and the other end of the round bar is rotatably supported by a tailstock.

2. Description of the Related Art

To normally lathe a round bar called an elongated stock, the intermediate portion of the round bar is rotatably supported by a chuck on the lathing apparatus side, and the other end face of the round bar is centered by a center drill. The machined center is rotatably supported using the tailstock of the lathing apparatus, thereby supporting the two ends of the round bar. After this preparatory process, an apron mounted with a cutting tool is moved along the longitudinal direction of the round bar to cut the round bar. This is general cutting.

On the other hand, a CNC automatic lathe cantilevers a round bar or pipe having a relatively small diameter to be rotatable and fed, and sequentially feeds the round bar with respect to a cutting tool or the like. The above center machining can be omitted, and at the same time parts having small diameters can be centered. For this reasons, the CNC automatic lathe is used properly.

According to this CNC automatic lathe, in a continuous unmanned automatic operation, to improve machining precision of the round bar supported to be rotatable and fed in a cantilevered state, a fixing bush (guide bush) is used to eliminate an off-axis error. For example, a rotary bush type CNC automatic lathe using a rotary bush rotated in interlocking with the round bar is used in practice in a limited field. A lathe of this type is more expensive than a fixing bush type CNC automatic lathe and causes an off-axis error as compared with the fixing bush type CNC automatic lathe. Therefore, machining precision of the rotary bush type CNC automatic lathe is poorer than that of the fixing bush type CNC automatic lathe.

Under the above circumstances, the fixing bush type CNC automatic lathes are currently more popular.

The fixing bush of the fixing bush type CNC automatic lathe will be described with reference to the accompanying drawing. FIG. 1 is a front view of the fixing bush illustrated together with a round bar 1.

Referring to FIG. 1, four expanding slots 3a in a substantially cross shape as shown in FIG. 1 are formed in a fixing bush 3. A hole 3n machined concentric with the outer-diameter portion of the fixing bush 3 is formed in a direction perpendicular to the drawing surface. The hole 3n is formed continuously with the expanding slots 3a.

The hole 3n is formed by a carbide material such as tungsten carbide 3c to. sufficiently assure the wear resistance. The hole 3n holds the round bar 1 so that the fixing bush 3 can feed the round bar 1 along the longitudinal direction of the round bar 1. At the same time, the round bar 1 rotated at a high speed in a direction indicated by an arrow in FIG. 1 is sequentially fed to a cutting tool 12 indicated by a broken line, thereby lathing the round bar 1 in the cantilevered state while eliminating an off-axis error. More specifically, the gap between the hole 3n of the fixing bush 3 and the outer surface of the round bar 1 must be minimized in lathing, and high-precision lathing with a very small off-axis error can be realized.

As described above, lathing using the fixing bush is limited to a metal material or any other industrial material capable of maintaining a sufficient sliding state even if the outer surface of the metal material such as free cutting steel containing a sulfur component, or copper is brought into direct contact with the hole 3n and rotated at a high speed to generate a large amount of heat. In other words, the manufacturer of the fixing bush type CNC automatic lathe does not guarantee use of a material excluding a free cutting metal material such as free cutting steel or copper.

For example, for metal titanium which makes it very difficult to lathe, a dedicated cutting tool whose rake angle is set to about 20° is prepared, the peripheral velocity of the round bar 1 is accurately managed, a cutting liquid set in a state of almost water is sufficiently supplied to cool metal titanium, thereby allowing lathing metal titanium, as is known well.

In such a hard cutting material, however, when the fixing bush 3 is directly used, scoring K occurs, as shown in FIG. 1.

When this scoring K occurs, a workpiece to be cut becomes defective, and scoring K acceleratedly grows. For this reason, in an unmanned automatic operation, the operation must be forcibly interrupted. In the worst case, the apparatus may be undesirably broken, thus posing the decisive problem.

It is said that a hard cutting material cannot be lathed in a fixing bush type CNC automatic lathe.

In order to lathe a stock called an elongated stock into a desired shape, the outer surface of one end portion of the stock is gripped by the chuck of the lathe, and the end face of the stock is cut with an end face tool. Subsequently, the end face of the other end of the stock is centered by a center drill or the like, the chuck is loosened, the stock is fed from the chuck by a machining length, and the machined center hole portion of the stock is rotatably supported by the tailstock of the lathe, thereby supporting the two ends of the stock. After these preparatory operations, an apron mounted with a cutting tool is moved along the longitudinal direction of the stock, thereby cutting the desired portion with the tool. This is general cutting.

To prevent an off-axis error in machining, off-axis error prevention devices each incorporating at least three rotary bearings may be fixed to the lathe in place of the tailstock. The intermediate portion of the stock is rotatably supported to lathe the stock, as needed.

To lathe a metal product, a stock is prepared in advance using a predetermined casting mold so as to obtain a so-called near-net shape similar to the shape of a final product because cutting of a solid material as a specification material into a desired shape results in high cost. Minimum machining and finishing are performed for the above stock using predetermined machine tools, thereby positively reducing the cost. This greatly contributes not only to energy saving in factories and the manufacture of uniform, lightweight products but also to social needs for preservation of terrestrial environment.

FIG. 2 is a front view showing machining on a product having the near-net shape. FIG. 2 exemplifies machining on the shaft mounting hole of a golf club head W as a product. The golf club head W in FIG. 2 is molded to be hollow by a metal casting mold or forging mold (not shown) using metal titanium.

A drilling machine is conventionally used to form the shaft mounting hole in the club head W having the above shape. More specifically, a jig 21 is used such that the machining surface faces upward on a table 20 of the drilling machine. The golf club head W is then fixed in a stationary state. A drill 22 is rotated and moved downward while properly supplying a cutting oil to the machining surface, thereby drilling the head W to a predetermined depth and hence forming a prepared hole. A thread cutting tap 23 having cutting teeth at a desired thread pitch of about M10 is then rotated at a constant speed and moved forward into the prepared hole, thereby performing thread cutting. The tap 23 is then rotated in the reverse direction and moved upward to complete thread cutting.

On the other hand, among the products having near-net shapes, a product which can be directly lathed is set on the chuck of the lathe, thereby lathing the product.

In machining using the above drilling machine, it is difficult to cut a product of a near-net shape made of metal titanium as one of the hard cutting materials which are very difficult to cut. To cope with this, as the drill 22, a dedicated drill having a cutting blade set at a rake angle of about 20° is required. A dedicated tap is also required as the tap 23. As is known well, the hard cutting material can be cut only under the conditions that the peripheral velocity of the spindle of the drilling machine is accurately managed, and the cutting liquid is set in the form of almost water and sufficiently supplied to cool the cutting surface.

In other words, machining is far from continuous cutting represented by NC lathing and must be performed by a machining center or a skilled worker who machines a single item.

Among the products having near-net shapes, a product which can be lathed but is made of metal titanium as one of the hard cutting materials causes scoring due to heat generated between the vibration prevention device and the center hole supported by the tailstock when the product is set on the chuck of the lathe and lathed. When this scoring occurs, the workpiece becomes defective, and scoring acceleratedly grows. For this reason, for example, in an unmanned automatic operation, the operation must be forcibly interrupted. In the worst case, the lathing apparatus is broken, thus posing a decisive problem. Therefore, it is commonly impossible to automatically lathe a hard cutting material.

The present inventors have made extensive studies and examinations on the cause of this scoring K and found the following.

A hard machining material such as the above-mentioned metal titanium, pure titanium, a titanium alloy, and stainless steel has a thermal conductivity of 22 (W/m·K) or less. This value is smaller than that of a free machining material such as free cutting steel or copper by one or more orders of magnitude.

Frictional heat generated upon rotation between the contact-surfaces of the outer surface of the round bar 1 made of, e.g., a titanium bar and the hole 3n of the fixing bush 3, and frictional heat generated upon rotation between the contact surfaces of the outer surface of a stock made of, e.g., metal titanium, the tailstock, and the contact prevention device are gradually accumulated in the round bar 1 (stock). As a result, the round bar 1 thermally expands to increase the diameter of the round bar 1 (stock) and is fused and partially fixed to the hole 3n. This is the cause of the scoring K according to the findings of the present inventors.

Bars and pipes containing hard machining materials are usually wound by antitarnish paper or specialty paper and shipped or managed at the time of shipment or in long-term storage to prevent contamination, damage, and rust. These operations require an extra number of steps to result in high cost.

A large number of lathed products made from round bars and pipes and having solid lubricant layers having predetermined thicknesses on the outer and inner surfaces are commercially available. To obtain these products, predetermined machining operations including lathing are performed, a portion except a prospective solid lubricant film formation portion is masked, and a solid lubricant film is then formed and dried, thereby obtaining a finished product.

For example, Japanese Patent Laid-Open No. 54-137569 discloses a composition for drawing a steel material using the mold release characteristics of TFE (low-molecular weight tetrafluoroethylene) as a fluorine polymer. This composition is effective to assure surface gloss after drawing, but does not positively contribute to formation of the solid lubricant layer. A separate step is required to form a solid lubricant layer having a predetermined thickness on the inner or outer surface of the product in this proposal.

As described above, formation of the solid lubricant layer results in an increase in the number of steps, and extra labor is required in management of semi-finished parts. This increases the cost.

SUMMARY OF THE INVENTION

The present invention has been made in consideration of the above problems, and has as its object to provide a lathing method and apparatus capable of allowing a fixing bush type CNC automatic lathe to lathe a hard cutting material, which has been conventionally impossible.

It is another object of the present invention to provide a lathing method and apparatus which allow a lathe including an NC automatic lathe to easily lathe a stock made of a hard cutting material.

It is still another object of the present invention to provide a round bar and a pipe free from an extra number of steps required for preventing contamination, damage, or rust.

It is still another object of the present invention to provide a low-cost lathed product having a solid lubricant layer having a predetermined thickness on its inner or outer surface.

It is still another object of the present invention to provide a lathing stock free from an extra number of steps for preventing contamination, damage, or rust.

In order to solve the above problems and achieve the above objects, according to the present invention, there is provided a lathing method which causes a guide bush disposed and fixed to a main body side of a lathing apparatus to rotatably hold a round bar to be fed in a longitudinal direction of the round bar, and sequentially feed the round bar from the guide bush to a machining tool disposed on the main body side, thereby performing lathing in a cantilevered state of the round bar, wherein a stock having a solid lubricant layer having a predetermined thickness on an outer surface of the stock is used as the round bar to reduce friction in a state of the round bar held by the guide bush.

There is also provided a lathing apparatus which causes a guide bush disposed and fixed to a main body side of the lathing apparatus to rotatably hold a round bar to be fed in a longitudinal direction of the round bar, and sequentially feed the round bar from the guide bush to a machining tool disposed on the main body side, thereby performing lathing in a cantilevered state of the round bar, wherein a stock having a solid lubricant layer having a predetermined thickness on an outer surface of the stock in advance is used as the round bar to reduce friction in a state of the round bar held by the guide bush.

There is further provided a round bar which is rotatably held to be fed in a longitudinal direction thereof by a guide bush disposed and fixed to a main body side of a lathing apparatus, and sequentially fed from the guide bush to a machining tool disposed on the main body side, thereby performing lathing of the round bar in a cantilevered state, wherein a solid lubricant layer having a predetermined thickness is formed on an outer surface of the round bar in advance to reduce friction in a state of the round bar held by the guide bush.

There is further provided a lathed product obtained such that a round bar is rotatably held to be fed in a longitudinal direction thereof by a guide bush disposed and fixed to a main body side of a lathing apparatus, and the round bar is sequentially fed from the guide bush to a machining tool disposed on the main body side, thereby performing lathing of the round bar in a cantilevered state, wherein a stock having a solid lubricant layer having a predetermined thickness on an outer surface of the stock in advance is used as the round bar, the round bar is so lathed as to reduce friction in a state of the round bar held by the guide bush, and the solid lubricant layer is left.

According to the present invention, there is further provided a lathing method which allows a chuck of a lathe which performs turning or a lathing apparatus which performs any other machining in addition to the turning to grip a stock and hold an outer surface of the stock, thereby performing lathing while preventing an off-axis error, wherein at least a solid lubricant layer having a predetermined thickness is formed in advance at a predetermined position where the stock is held in order to reduce friction, and an off-axis error prevention device holds the stock so as to be brought into slidable contact with the solid lubricant layer, thereby lathing the stock while preventing the off-axis error.

There is further provided a lathing apparatus which allows a chuck of a lathe which performs turning or a lathing apparatus which performs any other machining in addition to the turning to grip a stock and hold an outer surface of the stock, thereby performing lathing while preventing an off-axis error, comprising an off-axis error prevention device for holding the stock having at least a solid lubricant layer having a predetermined thickness at a predetermined position where the stock is held, so as to be brought into slidable contact with the solid lubricant layer, thereby lathing the stock while preventing the off-axis error.

There is further provided a lathing stock which is gripped by a chuck of a lathe which performs turning or a lathing apparatus which performs any other machining in addition to the turning and an outer surface of which is held, thereby performing lathing while preventing an off-axis error, wherein at least a solid lubricant layer having a predetermined thickness is formed in advance at a predetermined position where the stock is held in order to reduce friction, and an off-axis error prevention device holds the stock so as to be brought into slidable contact with the solid lubricant layer, thereby lathing the stock while preventing the off-axis error.

A lathed product obtained such that a stock including a ceramic product and a solid or hollow forged product, a precision-forged product, a hot-forged product, a cold-forged product, a warm-forged product, a cast product, a precision-cast product, a lost wax cast product, a centrifugal cast product, a metal injection-molded product, and a sintered metal product made of a metal material (e.g., pure titanium, a titanium alloy, stainless steel, a nickel alloy, Hastelloy (tradename), or Inconel (tradename)) or any other hard machining metal material having a thermal conductivity of 22 (W/m·K) is gripped by the chuck of a lathe which performs turning or a lathing apparatus which performs any other machining in addition to turning, and is lathed while holding the outer surface to prevent the off-axis error, a lathing stock has a solid lubricant layer having a predetermined thickness at the predetermined product holding position so as to reduce the friction, and an off-axis error prevention device hold the product in slidable contact with the solid lubricant layer, thereby performing lathing while preventing the off-axis error.

According to the present invention, there can be provided a lathing method and apparatus capable of lathing a hard cutting material in a fixing bush type CNC automatic lathe, which has been impossible in the conventional case.

There can also be provided a round bar free from an extra number of steps of preventing contamination, damage, and rust.

There can further be provided a low-cost lathed product having a solid lubricant layer having a predetermined thickness on its inner or outer surface.

In addition, according to the present invention, a stock made of a hard cutting material can be easily lathed by a lathe including an NC automatic lathe. There can also be provided a lathing stock free from an extra number of steps of preventing contamination, damage, or rust.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described with reference to the accompanying drawings.

Figure 1:
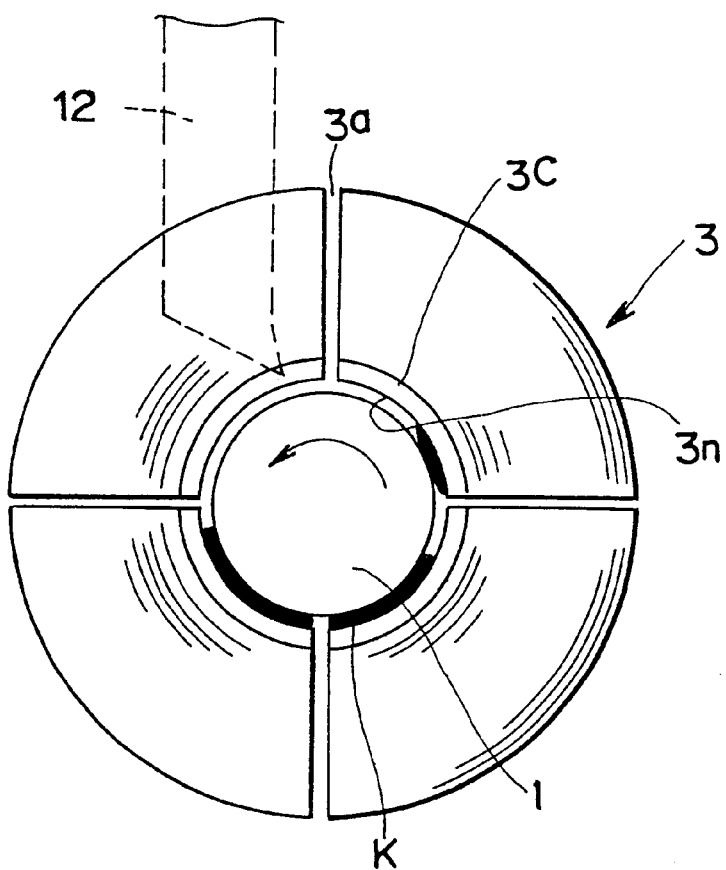
FIG. 1 is a front view showing the structure of a conventional fixing bush.
Figure 2:
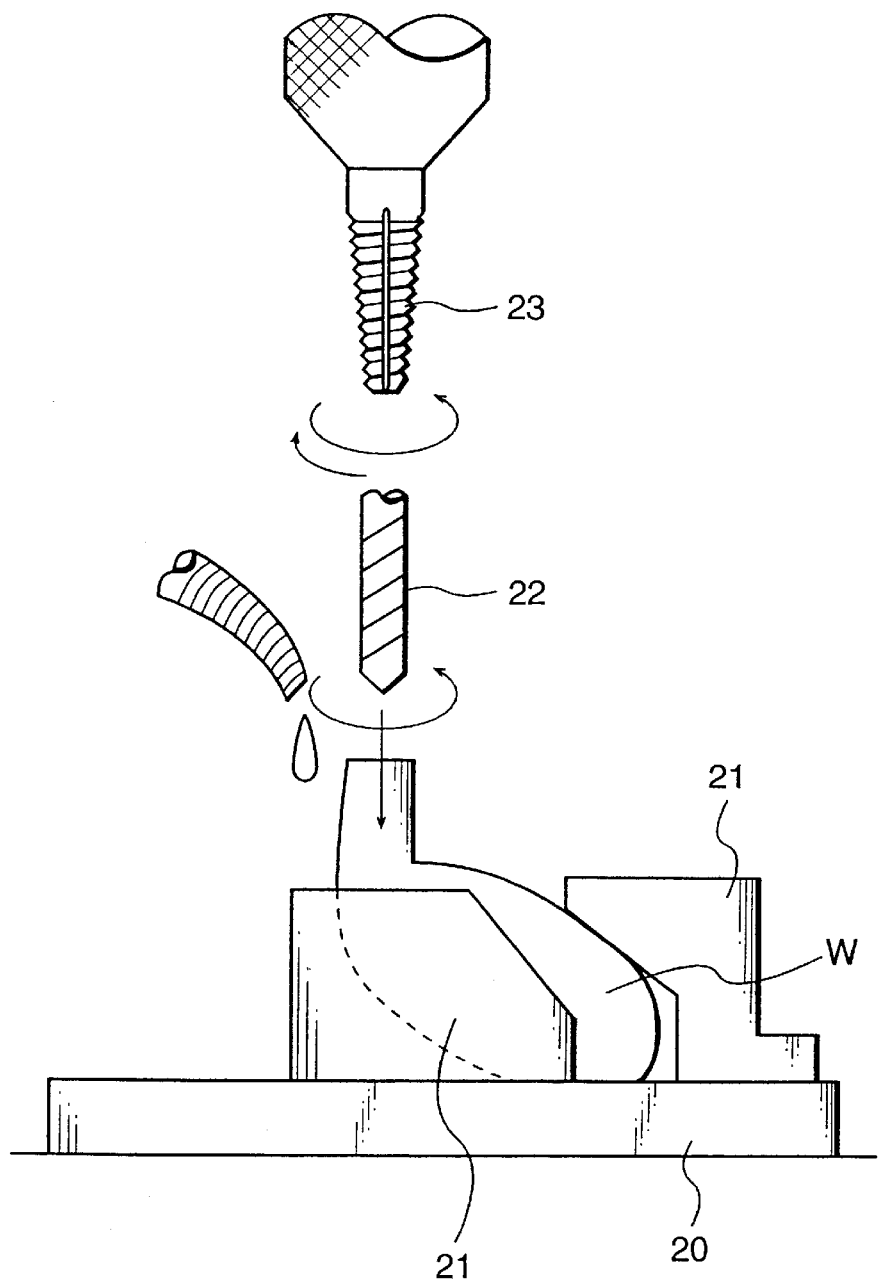
FIG. 2 is a front view showing an example of conventional machining.
Figure 3:
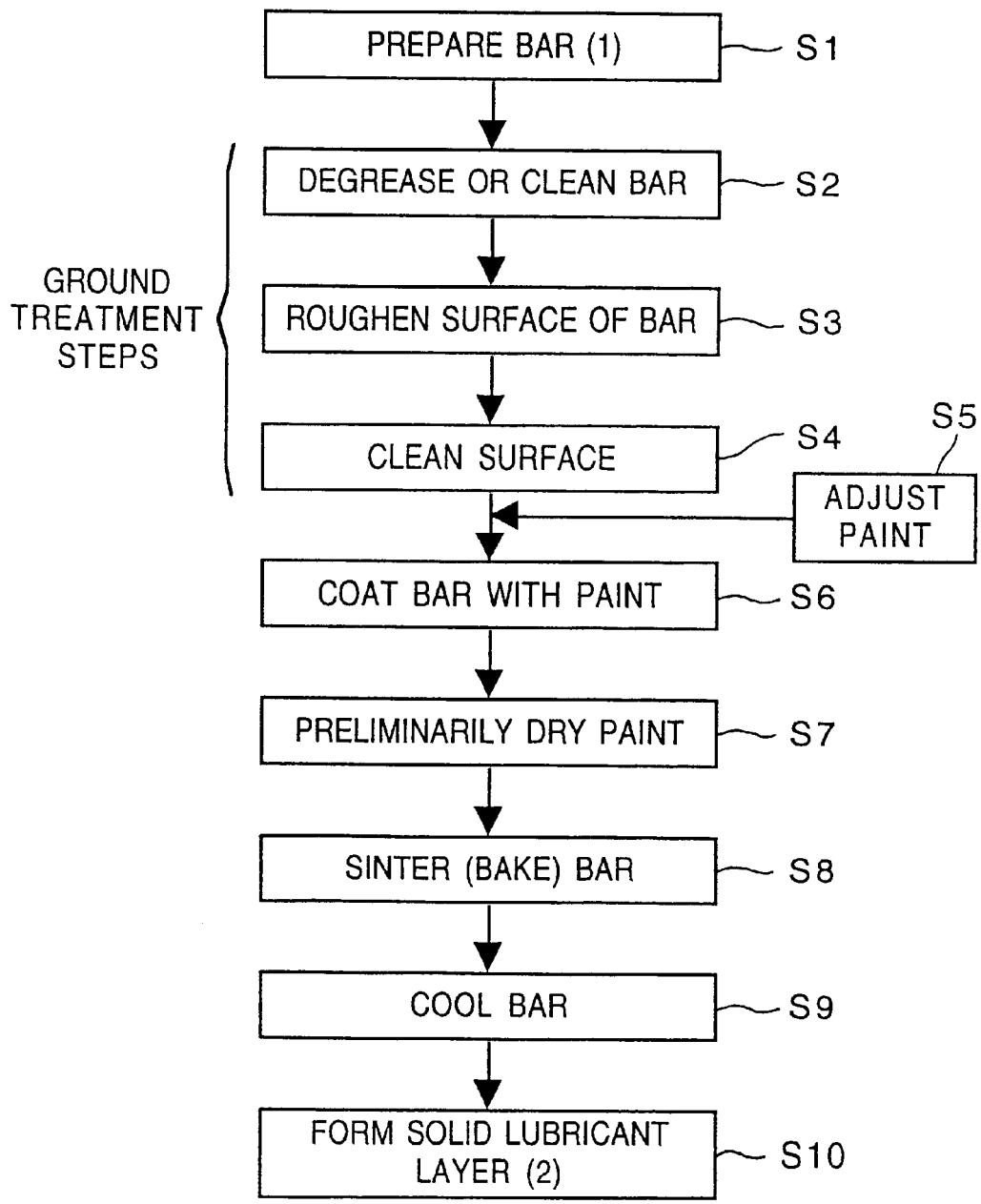
FIG. 3 is a flow chart showing the steps of forming a solid lubricant layer in the lathing method of the present invention.

FIG. 3 is a flow chart showing the steps of forming a solid lubricant layer. Referring to FIG. 3, in step S1, one batch of a solid or tubular round bar 1 having predetermined diameter and length and made of a metal material (e.g., pure titanium, a titanium alloy, stainless steel, a nickel alloy, Hastelloy (tradename), or Inconel (tradename)) or any other hard machining metal material having a thermal conductivity of 22 (W/m·K) is prepared and stored in a tray.

The flow advances to step S2 to degrease the round bar 1 with trichloroethylene or carbon tetrachloride or wash it with water to remove the surface contamination, thereby preventing coating irregularity or a decrease in adhesion strength (to be described later).

In step S3, sand blasting using alumina (60- to 120-mesh), liquid honing, or equivalent surface roughening is performed on the entire surfaces including the outer and inner surfaces.

The physical treatment of the round bar has thus been complete, and the flow advances to step S4. The surface of the round bar is cleaned by flashing with high-pressure air or washing with water. The steps S2 to S4 are called the ground treatment steps. Any step in these steps can be omitted, as needed.

In step S5, a paint is stirred, and its viscosity is adjusted using a thinner or the like, as needed, thereby preparing for coating.

In step S6, the round bar is coated with a primer, as needed, and then uniformly coated with a fluoroplastic paint containing PTFE (polytetrafluoroethylene) using a spray gun, a roll coater, or dipping.

In step S7, the paint is preliminarily dried at 100° C. for about 30 min. In step S8, the round bar is then baked at 380° C. for about 30 min.

The flow then advances to step S9 to cool the round bar. In this case, cooling at room temperature can sufficiently assure durability against sliding of the fixing bush. However, if a solid lubricant layer is left on the finished product and is exposed to a high temperature or steam, the round bar is immediately cooled with water upon baking, thereby improving the durability.

A solid lubricant layer 2 is formed on the surface of the round bar 1, as described above. This round bar is shipped to factories. Note that round bars include a round bar having upper, lower, side surfaces, and a round bar as a pipe having the solid lubricant layers 2 formed on the outer and inner surfaces. If the round bar 1 with the solid lubricant layer 2 is to be lathed in the fixing bush type CNC automatic lathe, the material is not limited to the hard machining material, but can be a free machining material.

As the material of the solid lubricant layer 2, a fluoroplastic paint, a molybdenum disulfide paint, a tungsten disulfide paint, a graphite paint, a boron nitride paint, a polyimide paint, a polyamide paint, a PBI (polybenzoimidazole) paint, a silicone paint, a polysulfone paint, a polyether paint, a polyether ether ketone paint are used singly or in combination. As forming conditions, each material must be formed into a very thin film, and the resultant film is not destroyed. Preferably, the solid lubricant layer 2 has a thickness of 1 μm to 100 μm to prevent brittle fracture in the state of the round bar held by the fixing bush. The outer diameter tolerance of a round bar preferably falls within the general tolerance.

Figure 4:
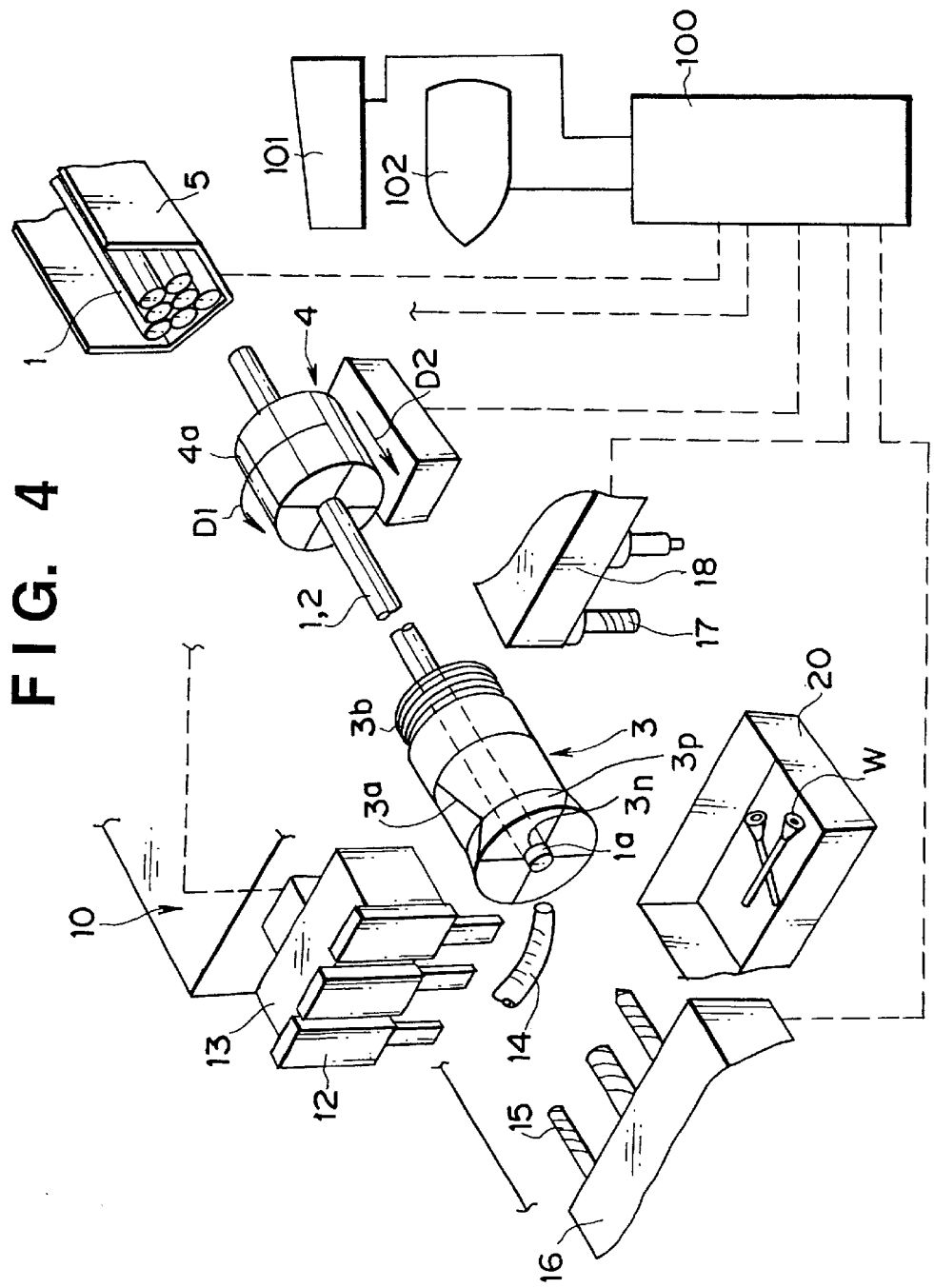
FIG. 4 is a view showing the principle of lathing in a fixing bush type CNC automatic lathe in a lathing apparatus according to the first embodiment of the present invention.

FIG. 4 a view showing the principle of lathing in the fixing bush type CNC automatic lathe.

Referring to FIG. 4, a hopper 5 for storing a large number of round bars 1 undergone the process shown in FIG. 3 is disposed behind a main body 10 of the lathing apparatus. The round bars 1 stored in the hopper 5 are fed one by one from the lowermost one toward the downstream side.

A gripping/rotary feed mechanism 4 is disposed on the downstream side of the hopper 5. In this mechanism 4, the intermediate portion of the fed round bar 1 is gripped by a chuck portion 4a, rotated at high speed in the direction of an arrow D1, and fed at a designated speed in the direction of an arrow D2.

A fixing bush 3 fixed on the main body 10 is disposed downstream the gripping/rotary feed mechanism 4. An end portion 1a of the round bar 1 guided through a hole 3 of the fixing bush 3 is held to extend on the cutting tool 12 side.

Figure 6:
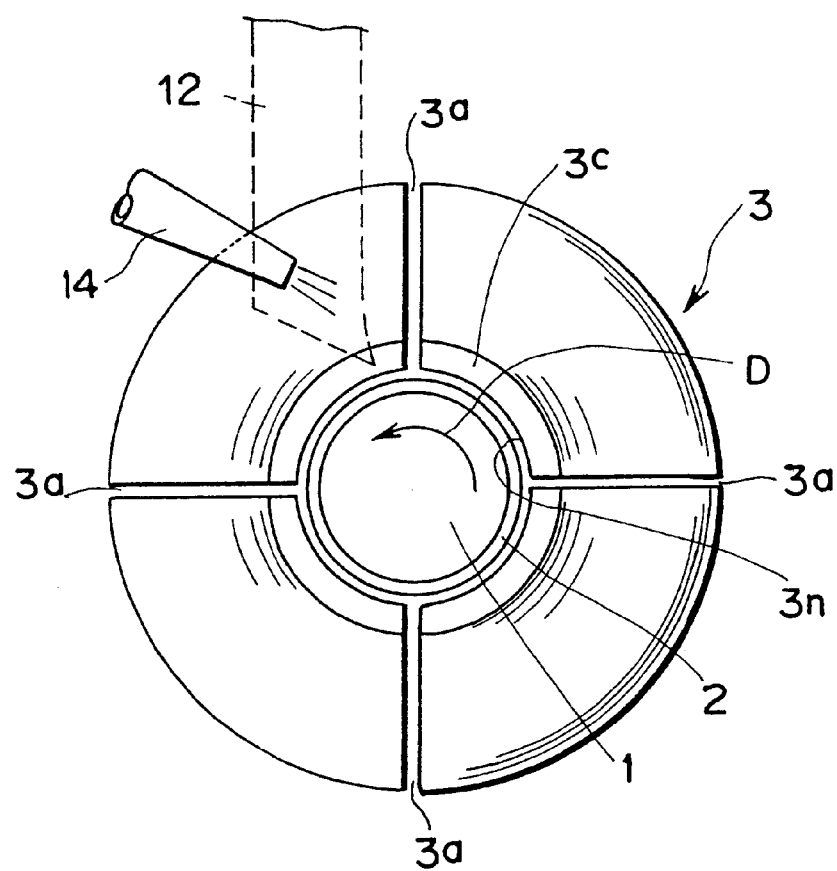
FIG. 6 is a front view showing the state in which a fixing bush 3 shown in FIG. 4 is extracted.

Referring to the front view of the fixing bush 3 shown in FIG. 6, four expanding slots 3a in an almost cross shape are formed in the fixing bush 3. A hole 3n formed concentrically with the outer diameter portion of the fixing bush 3 is formed continuously with the expanding slots 3a. The hole 3n is formed by a carbide material such as tungsten carbide 3c to sufficiently assure wear resistance. For this reason, the fixing bush 3 holds the round bar 1 to feed it along the longitudinal direction of the round bar 1 and sequentially feeds the round bar 1 to a cutting tool 12 and a drill 15 which are rotated at high speed in the direction of the arrow D1. Therefore, lathing in the cantilevered state can be performed without any off-axis error.

For this purpose, in the preparation for lathing, a nut (not shown) is threadably engaged with a screw portion 3b, and the nut is gradually tightened-to narrow the expanding slots 3a by a force generated by a taper portion 3P, thereby minimizing the gap between the hole 3n of the fixing bush 3 and the outer surface of the round bar 1. After this preparation, lathing is performed to achieve precision lathing with the minimum off-axis error. In FIG. 6, a gap is formed between the hole 3n and an outer surface layer 2 of the round bar 1 due to the illustrative convenience. After the above preparation, the gap is adjusted to be a very small size (several μm to several ten μm) in accordance with the precision of a workpiece.

A movable table 13 having a plurality of types of cutting tools 12, a movable table 16 having the drills having different diameters, and a movable table 18 having different vertical end mills are arranged on the main body 10 to be movable with respect to the main body 10. A supply portion 14 for supplying a cutting liquid to a cutting portion, and a tray 20 for storing a finished work W are also arranged in the main body 10.

A controller 100 is connected to the hopper 5, the gripping/rotary feed mechanism 4, and each movable table through signal lines indicated by broken lines. The controller 100 can execute an automatic lathing program using an input device 101 and a display device 102 connected to the controller 100.

Figure 5:
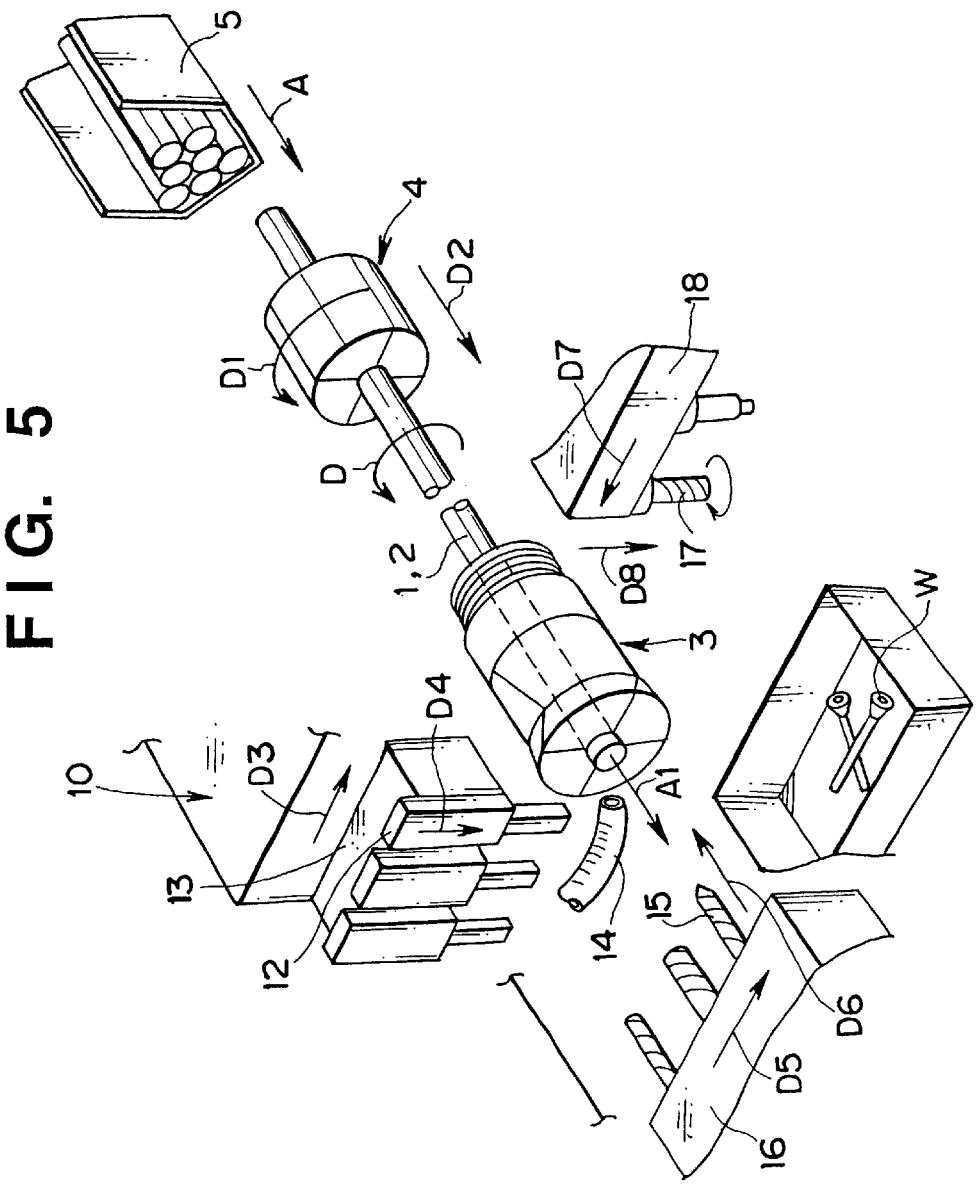
FIG. 5 is a view for explaining the operation of lathing in the fixing bush type CNC automatic lathe shown in FIG. 4.

FIG. 5 is a view for explaining the operation after the automatic lathing program for machining the work W having the illustrated shape is started.

Referring to FIG. 5, the machining program for machining the work W having the illustrated shape is input to the controller 100 using the input device 101 and the display device 102. When the program is started, the round bar 1 is fed from the hopper 5 in the direction of an arrow A, and the intermediate portion of the round bar 1 is gripped by the gripping/rotary feed mechanism 4, as shown in FIG. 5. The round bar 1 is held by the fixing bush 3 set to have the minimum necessary gap in the above preparation and rotated.

To drill the round bar using the drill 15, the movable table 16 is moved in the direction of an arrow D5 and then in the direction of an arrow D6, thereby starting drilling the round bar. After or before this operation, the movable table 13 is moved in the direction of an arrow D3 to select a desired tool. The movable table 13 is then moved by a distance corresponding to the cutting amount of the tool 12 in the direction of an arrow D4 and then stopped.

The round bar 1 is then fed (direction of arrow A1) upon movement of the gripping/rotary feed mechanism 4 in the direction of the arrow D2, thereby cutting the round bar 1. At this time, the cutting liquid is supplied from the supply portion 14 to the cutting portion. Even a hard cutting material can be cut without using a special cutting liquid or oil.

With the above operation, the work W having the illustrated arbitrary shape can be machined. The movable table 18 having the end mills 17 is used to cut the round bar 1 kept stopped by the fixing bush at a predetermined angle. The end mills can perform machining on various shape portions such as keyways and bolt heads. Therefore, all types of machining can be performed for a desired product in a single lathing apparatus. In addition, a grinder may be added to this lathing apparatus.

Machining using the round bar 1 automatically fed is based on an unmanned automatic operation. Conventionally, when a hard machining material such as pure titanium, a titanium alloy, or stainless steel having a thermal conductivity of 22 (W/m·K) or less is directly used, the contact surface between the outer surface of the round bar 1 and the hole 3n of the fixing bush 3 generates frictional heat upon rotation to gradually accumulate the heat in the round bar 1, thereby causing the thermal expansion of the round bar 1. The outer diameter of the round bar 1 increases to cause partial scoring with the hole 3n. The automatic operation must be forcibly interrupted.

However, referring back to FIG. 6, as the round bar 1, the bar having the solid lubricant layer 2 having the predetermined thickness on the outer surface through the steps described with reference to FIG. 3 is used, so that friction can be reduced in the holding state of the fixing bush 3, while the round bar 1 is rotated at high speed in the direction of the arrow D, thereby lathing the round bar with the tool 12 indicated by the broken line. An amount of heat caused by the friction can be reduced, and as a result, excellent machining can be performed even with a hard cutting material.

Figure 7A:
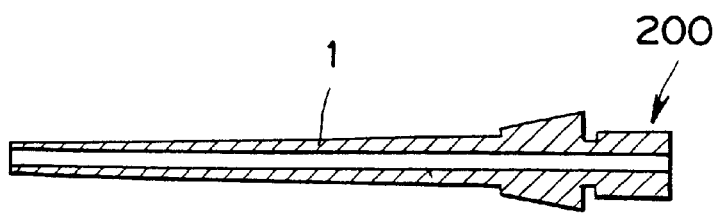
FIGS. 7A to 7C are longitudinal sectional views showing different lathed products obtained by the lathing method of the present invention.
Figure 7B:
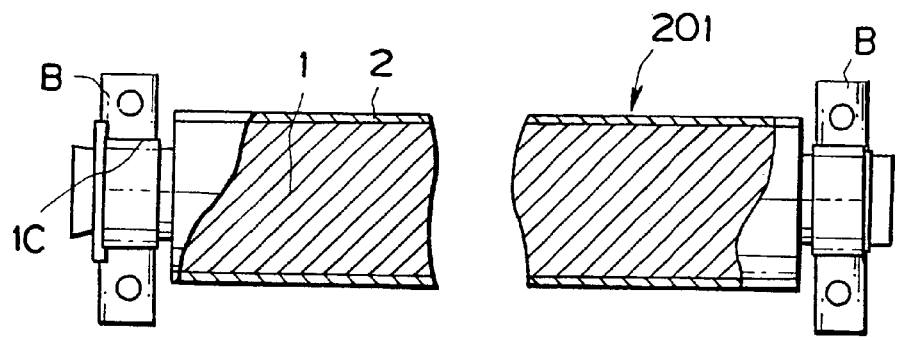

FIGS. 7A and 7B are longitudinal sectional views of lathed products. FIG. 7A is a longitudinal sectional view of a needle 200 obtained by cutting by the above method using a metal titanium round bar 1 having an outer diameter of 6 mm.

The needle 200 is used as the non-adjusted needle for an ultrasonic knife for cataractal surgery. The total length of the needle is about 35 mm, and the outer diameter of the distal end portion of the needle is about 0.8 mm. The needle has a through hole. Conventionally, to obtain such a needle 200, a dedicated cutting tool is prepared, and a dedicated cutting liquid is used in a large amount, and the needles are manufactured one by one, resulting in high cost. For this reason, the needle is reused by disinfection after the surgery.

Such needles 200 can be mass-produced with high precision at low cost as follows. The lathe shown in FIGS. 4 and 5 is used, a large number of metal titanium round bars 1 having a total length of, e.g., about 200 to 250 cm are set in the hopper 5, and the lathe is automatically operated in the unmanned state at a predetermined speed (about 2,000 rpm).

As a result, since the needles can be mass-produced at low cost, they can be handled as disposable products like syringes, thereby positively preventing nosocomial infection.

FIG. 7B is a longitudinal sectional view of a roller 201. A solid lubricant layer 2 is left on the roller 201, and only portions 1c pressed into bearings B are machined.

By this machining, the solid lubricant layer 2 need not be separately formed on the outer surface of the roller 201. In addition, since the solid lubricant layer 2 is formed on the round bar 1 in advance, consideration for preventing contamination, damage, and rust need not be made.

Figure 7C:
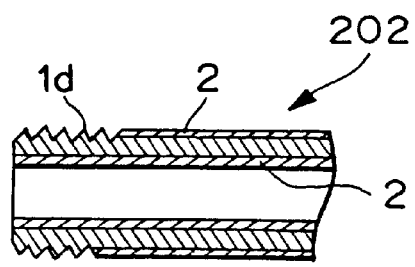

FIG. 7C is a sectional view of a lathed joint product 202 obtained such that a pipe 1 having solid lubricant layers 2 on both the inner and outer surfaces of the pipe is lathed using the lathe shown in FIGS. 4 and 5. The solid lubricant layers 2 are left on both the inner and outer surfaces except a screw portion 1d which is lathed, thereby providing a rustproof product capable of reducing the resistance with a fluid flowing inside the pipe. Note that the illustrated product can be manufactured using thread cutting apparatuses and tools such as a normal NC lathe and a general-purpose lathe.

As described above, the thickness of the solid lubricant layer 2 is preferably set to 1 μm to 100 μm to prevent brittle fracture caused by holding and sliding of the fixing bush 3. However, for example, as shown in FIG. 7C, in the joint product 202 having the screw portion id requiring no special machining precision, machining can be performed in a light holding state. Even if the thickness of the solid lubricant layer 2 is increased, no brittle fracture occurs. Therefore, the solid lubricant layer 2 can be made thick.

Finally, in the above description, the solid lubricant layer 2 is formed on the round bar 1 in advance. However, a solid lubricant layer 2 may be formed on the hole 3n side of the fixing bush 3 as needed, and lathing may be performed, provided that the solid lubricant layer 2 of the fixing bush 3 wears soon. In this case, the automatic continuous operation cannot be performed.

Another embodiment of the present invention will be described below. In the following description, the same reference numerals as in the above embodiment denote the same parts, and a detailed description thereof will be omitted.

Figure 8:
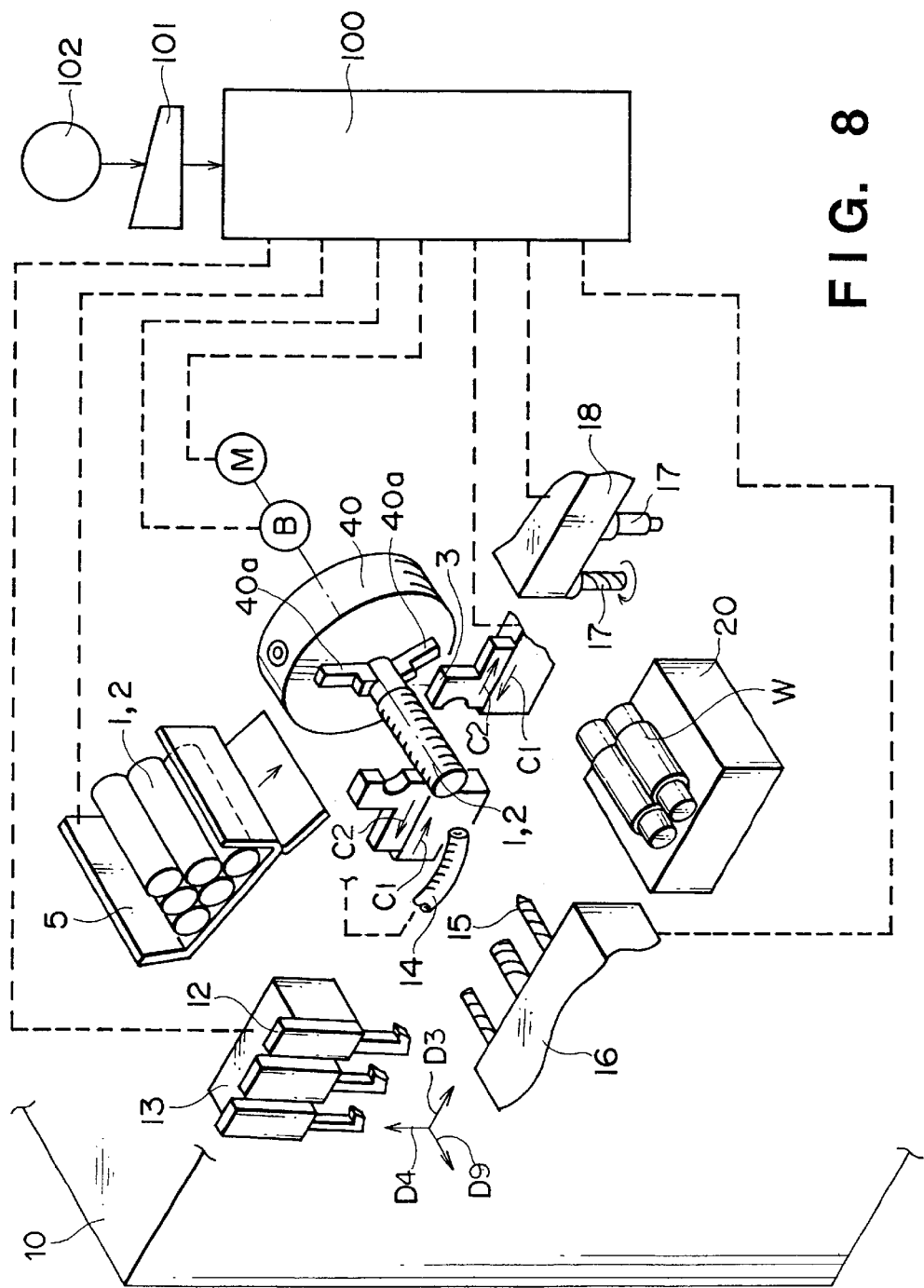
FIG. 8 is a view showing the principle of lathing performed in an automatic lathe according to the second embodiment of the present invention.
Figure 9:
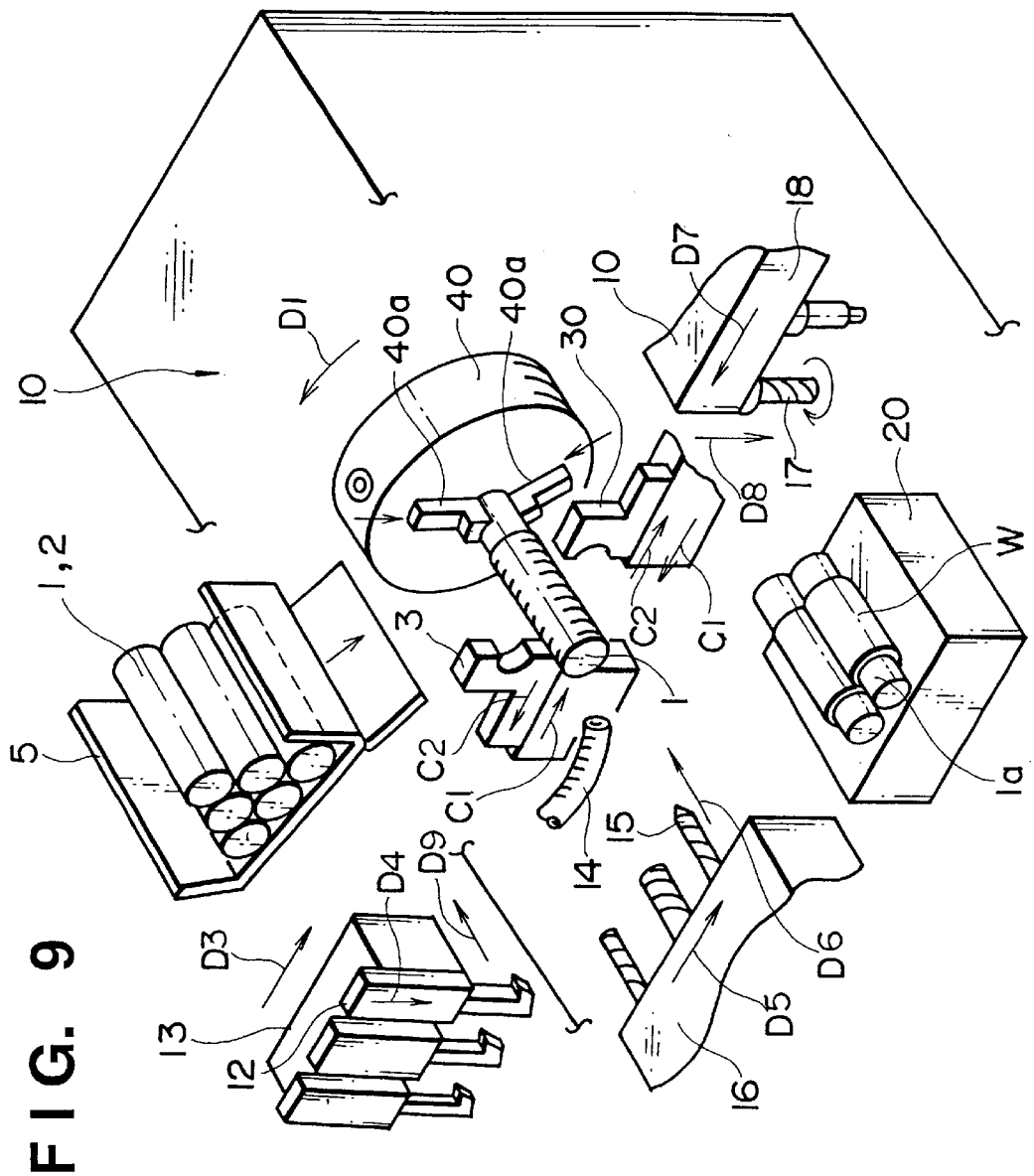
FIG. 9 is a view for explaining the lathing operation performed by the automatic lathe shown in FIG. 8.

FIGS. 8 and 9 are views showing the principle of lathing in an automatic lathe according to another embodiment of the present invention. Referring to FIGS. 8 and 9, a chuck 40 having a drive unit constituted by a brake B and a motor M is arranged in a main body 10 of the lathing apparatus. Chuck grippers 40a disposed in the chuck 40 grip at least three portions of the outer surface of a stock 1 to rotate the stock 1.

A hopper 5 for storing a large number of stocks 1 each having a solid lubricant layer 2 formed in the step shown in FIG. 3 is disposed above the main body 10 near the chuck 40. The stocks 1 stored in the hopper 5 are fed one by one from the frontmost one by an operator or a feed device such as a robot, and the fed stock is gripped by the chuck grippers 4a.

Off-axis error prevention mechanisms 30 which can dividedly move in the right and left directions (directions of arrows C1 and C2) to slidably support the intermediate portions of the solid lubricant layer 2 of the stock 1 are disposed in the main body 10.

Figure 10A:
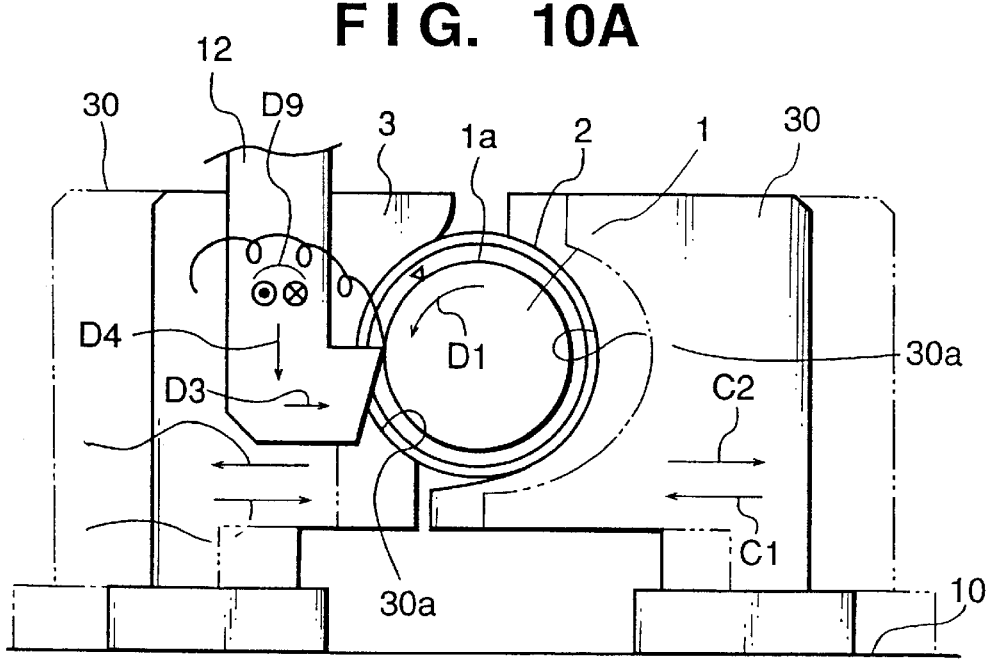
FIGS. 10A to 10C are front views showing an off-axis error prevention device shown in FIG. 8.

Further referring to the front view of the off-axis error prevention mechanism 30 shown in FIG. 10A, a sliding surface 30a having a shape conforming to the outer surface of the solid lubricant layer 2 is made of a carbide material such as tungsten carbide as shown in FIG. 10A in the off-axis error prevention mechanism 30, thereby sufficiently assuring wear resistance. Cylinders (not shown) respectively moved to the positions indicated by the broken lines are disposed in the off-axis error prevention mechanism 30 to introduce the stock 1 fed from the hopper 5 to a space defined with the sliding surface 30a. The off-axis error prevention mechanism 30 is moved to the position indicated by the solid line to support the stock 1.

Referring back to FIG. 8, a moving table 13 having a plurality of types of cutting tools 12, a moving table 16 having drills 15 having different diameters, and a moving table 18 having vertical end mills 17 having different outer diameters are disposed in the main body so as to be relatively moved by a drive mechanism (not shown) with respect to the main body 10. A supply portion 14 for supplying a cutting liquid to a cutting portion and a tray 20 for storing a finished work W are disposed in the main body 10.

A controller 100 is connected to the hopper 5, the off-axis preventing mechanisms 30, the chuck 40, and each moving table through signal lines indicated by the broken lines. The controller 100 can execute an automatic lathing program using an input device 101 and a display device 102 connected to the controller 100.

In the lathe having the above arrangement, the stock 1 is gripped by the chuck, and high-precision lathing is performed with a minimum off-axis error by the off-axis error prevention mechanisms 30. Referring to FIG. 10A, the gap between the sliding surface 30a and the solid lubricant layer 2 is adjusted to a required size (several $\mu$m to several ten $\mu$m), as needed.

FIG. 9 is a view for explaining the operation after the automatic lathing program for lathing the work W having the illustrated shape from the stock 1.

Referring to FIG. 9, a machining program for the work W having the illustrated shape is input to the controller 100 using the input device 101 and the display device 102. When the apparatus is started, the stock 1 is fed by an operator or a feed device such as a robot from the hopper 5 and stopped and positioned in the center of rotation of the chuck 40. When the chuck grippers 40a are moved in the directions indicated by the arrows to grip the end portion of the stock 1. The intermediate portion of the stock 1 is moved so that the off-axis preventing mechanisms 30 come close each other. The stock 1 is held, as shown in FIG. 10A, and rotation in the direction of an arrow D1 is started.

Subsequently, the movable table 16 is moved in the direction of an arrow D5 and then the direction of an arrow D6 to dill the stock 1 with the drill 15. After or before this operation, the movable table 13 is moved in the direction of an arrow D3 to select a desired cutting tool. The movable table 13 is then moved by a distance corresponding to the cutting amount of the cutting tool 12 in the direction of an arrow D4 and then stopped.

The chuck 40 is moved in the direction of the arrow D1 and at the same time the cutting tool 12 is moved in the direction of an arrow D9 to cut the stock 1. At this time, the cutting liquid is supplied from the supply portion 14 to the cutting portion. Even a hard cutting material can be cut without using any special cutting liquid or oil.

By the above operation, as shown in FIG. 10A, a cutting surface 1a is cut to obtain the work W. The moving table 18 having the end mills 17 is used to cut the stock 1 which is kept stopped by the fixing bush at a predetermined angle. The end mills can perform machining on various shape portions such as keyways and bolt heads. Therefore, all types of machining can be performed for a desired product in a single lathing apparatus. In addition, a grinder may be added to this lathing apparatus.

Machining using the stock 1 automatically fed is based on an unmanned automatic operation. Conventionally, when a hard machining material such as pure titanium, a titanium alloy, or stainless steel having a thermal conductivity of 22 (W/m·K) or less is directly used, the contact surface between the outer surface of the stock 1 and the off-axis preventing mechanisms 30 generates frictional heat upon rotation to gradually accumulate the heat in the stock 1, thereby causing the thermal expansion of the stock 1. The outer diameter of the stock 1 increases to cause partial scoring with the sliding surface. The automatic operation must be forcibly interrupted.

However, referring back to FIG. 10A, as the stock 1, the stock having the solid lubricant layer 2 having the predetermined thickness on the outer surface through the steps described with reference to FIG. 3 is used, so that friction can be reduced in the holding states of the sliding surfaces of the off-axis error prevention mechanisms 30, while the stock 1 is rotated at high speed in the direction of the arrow D1, thereby lathing the round bar with the cutting tool 12. An amount of heat caused by the friction can be reduced, and as a result, excellent machining can be performed even with a hard cutting material.

A conventional technique for preventing generation of frictional heat at the sliding surface is known wherein by the off-axis error prevention mechanisms each having three radial ball bearings at an angular interval of 120°, the outer surface of the stock is regulated to prevent the off-axis error. According to the off-axis error prevention mechanism using these bearings, the stock is limited to the one having a perfect circle to drive the bearings in constant contact with the outer surface.

Figure 10B:
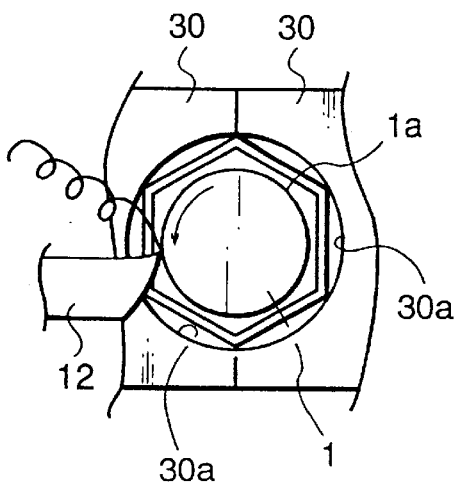

The bearing built-in off-axis error prevention mechanism cannot be used for a regular hexagonal stock 1 shown in FIG. 10B. However, as described with reference to FIG. 3, a solid lubricant layer 2 is formed on the outer surface of the stock 1 in advance, the six corners of the regular hexagonal stock are guided by the sliding surfaces 30a of the off-axis error prevention mechanism 30, and the stock is cut with the tool 12 while the machining surface 1a is prevented from the off-axis error. That is, the sliding surface 30a is brought into contact with the corner to allow rotation of the stock 1, thereby preventing the off-axis error. At this time, the solid lubricant layer 2 is not uniformly worn, but only the layer 2 at the corners is worn. When cutting using the cutting tool 12 is complete before the film at the corners is cutting worn, no problem occurs.

Figure 10C:
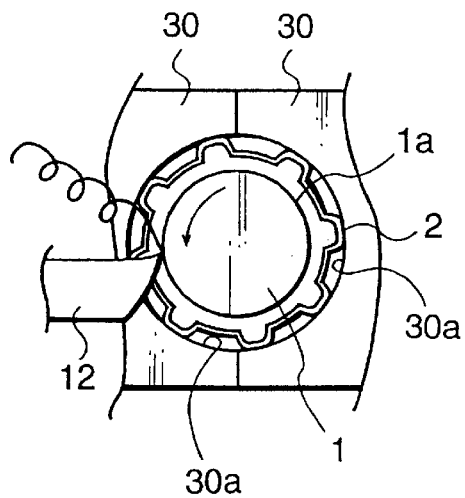

Similarly, the bearing built-in off-axis error prevention mechanism cannot be used for a stock in the form of a profile spline shaft shown in FIG. 10C. However, a solid lubricant layer 2 is formed on the outer surface of the stock 1 as shown in FIG. 10C, a large number of external teeth are guided by the sliding surfaces 30a of the off-axis error prevention mechanisms 30, and the stock is cut with the cutting tool 12, thereby cutting the machining surface 1a while preventing the off-axis error. The sliding surfaces 30a are brought into contact with the external teeth to rotate the stock 1. At this time, the solid lubricant layer 2 is not uniformly worn, but only the teeth are worn. When cutting with the tool 12 is complete before the teeth are worn, no problem is posed.

An apparatus for continuously conveying a stock from a supply portion arranged at the rear end side of the chuck is used for a profile bar.

Figure 11A:
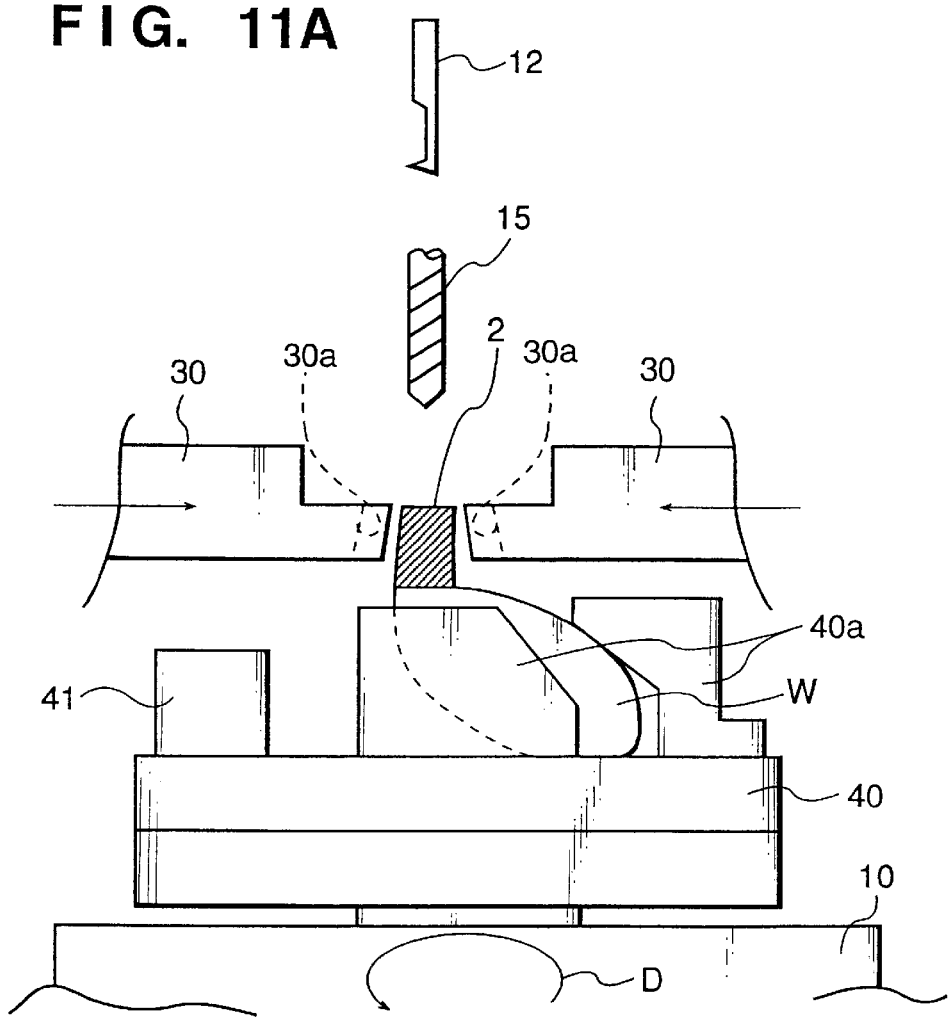
FIGS. 11A and 11B are front views showing lathing using the automatic lathe shown in FIG. 8.
Figure 11B:
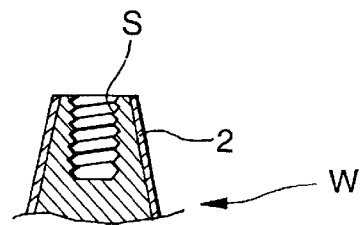

FIGS. 11A and 11B are views showing machining on a product having a near-net shape. A shaft mounting hole is formed in a golf club head W as a product. Referring to FIGS. 11A and 11B, the golf club head W is formed to be hollow from metal titanium using a metal casting mold (not shown).

To form the shaft mounting hole in the golf club head W having the above shape, the drilling machine or machining center is mainly used as described above, and automatic drilling is difficult. However, as shown in FIG. 11A, the golf club head W is fixed by chuck grippers 40a of a chuck 40 disposed in a main body 10 of the lathing apparatus, as shown in FIG. 11A and is lathed so as to consider future automatic machining. The same reference numerals as described above denote the same parts, and a detailed description thereof will be omitted. Parts which are not described will be explained.

A counterweight 41 is fixed to the chuck 40 to make dynamic balance during rotation. The chuck grippers 40a are set so that the center of the machining surface is located at the center of the drill 15 when the work is gripped. A solid lubricant layer 2 is formed on the outer surface of the shaft mounting portion of the work W. The solid lubricant layer 2 is formed not only on the surfaces supported by the sliding surfaces 30a of the off-axis error prevention mechanisms 30 but also on the entire surface of the work W.

As described above, the machining surface is made to face upward, the solid lubricant layer 2 is supported by the sliding surfaces 30a of the off-axis error prevention mechanisms 30, the cutting oil is appropriately supplied to the machining surface, and the drill 15 is moved downward while rotating the chuck 40 in the direction of an arrow D, thereby forming the prepared hole to a predetermined depth.

Thread cutting is performed by a thread cutting tool 12 having cutting teeth at a desired thread pitch while moving the cutting tool 12 at a constant pitch. The cutting tool 12 is escaped from the ridge and moved upward, thereby performing thread cutting S shown in FIG. 11B.

According to this thread cutting S, since a thread cutting tap is not used, the thread can be formed at an arbitrary pitch. Thread cutting for forming a tapered thread toward the distal end can also be arbitrary performed.

As described above, even if a product which is not suitable for lathing can be lathed directly. In addition, for example, even a product having a near-net shape and made of a titanium material as one of the hard cutting materials which are difficult to cut can be cut. In other words, continuous cutting represented by NC lathing can be performed.

According to lathing described above, the solid lubricant layer 2 can be left as it is. Machining in which the solid lubricant layer 2 is completely removed can be explained with reference to a filter material in FIGS. 12A to 12E.

Figure 12A:
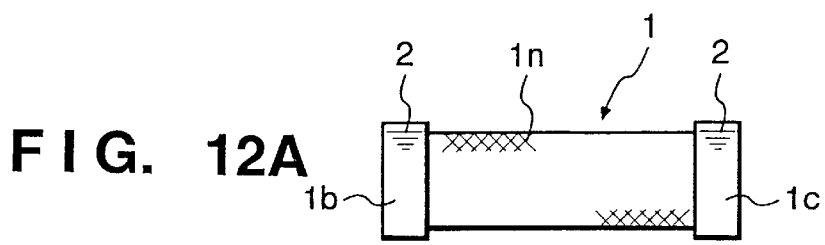
FIGS. 12A to 12E are views showing the lathing steps using the automatic lathe shown in FIG. 8.

Referring to FIG. 12A, a filter material 1 is used as a filter for chemical plants, fuel cells, or the like. The filter material 1 has a body of a titanium mesh in having 10-$\mu$m holes as shown in FIGS. 12A to 12E, and left and right flanges 1b and 1c integrally formed with the body of the mesh 1n. Solid lubricant layers 2 are formed on the flanges 1b and 1c, respectively.

Figure 12B:
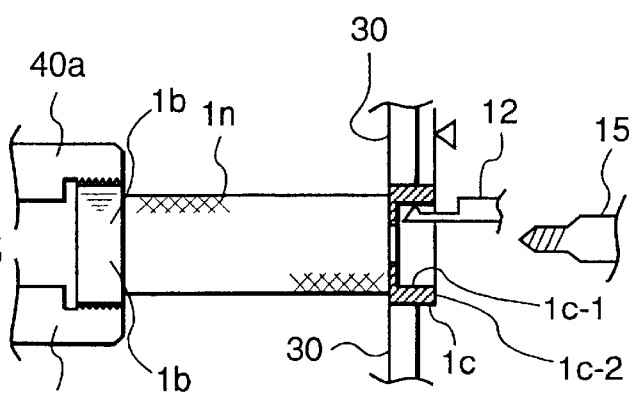

The flange 1b of the filter material 1 is gripped by the chuck grippers 4a, as shown in FIG. 12B, and the flange 1c is supported by off-axis error prevention mechanisms 30. An inner surface 1c-1 of the flange 1c is cut with a cutting tool 12, and at the same time an end face 1c-2 of the flange 1c is machined.

Figure 12C:
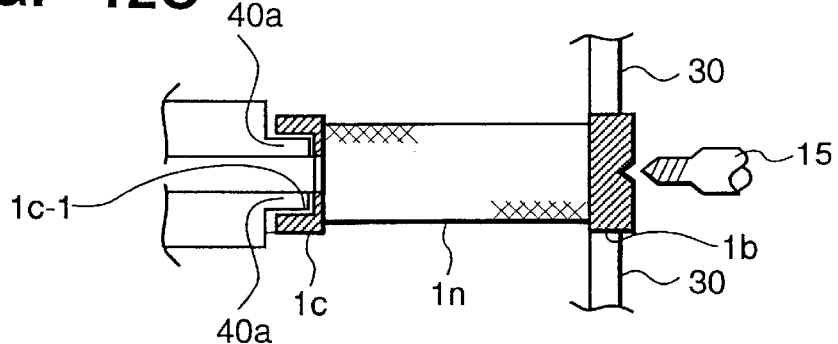

Chucks 40 are loosened, and the inner surface 1c-1 of the filter material 1 is gripped by the chuck grippers 40a of the lathe, as shown in FIG. 12C, and at the same time, the flange 1b is rotated while being supported by the off-axis error prevention mechanisms 30, thereby forming a center hole by a center drill 15.

Figure 12D:
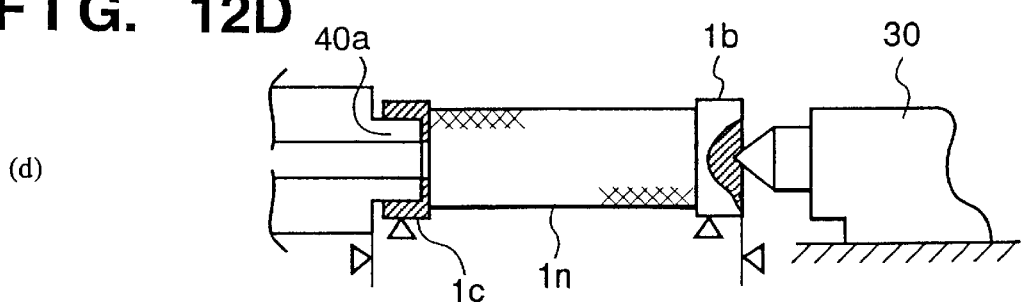
Figure 12E:
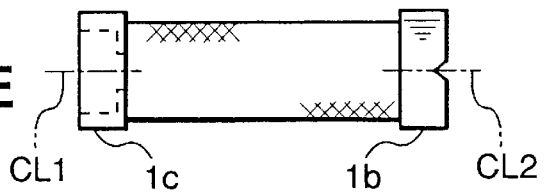

As shown in FIG. 12D, while the rotation center of a tailstock 30 supports the center hole, finishing is performed for the flange 1c, and finishing is performed for the outer surface of the flange 1b, thereby completely removing the solid lubricant layer 2.

According to the filter material 1 having undergone the above process, centers CL1 and CL2 of the outer surfaces of the left and right flanges 1c and 1b can be machined concentrically. For this reason, the filter material 1 shown in FIG. 12A is prepared, and a plurality of lathes are operated in an unmanned automatic operation, thereby mass-producing the filters at low cost. Since the solid lubricant layer 2 is formed on the outer surface, the filter is not contaminated or damaged, and the stock and product can be shipped directly. The filter need not be wrapped with anti-tarnish paper. That is, a lathing stock or lathed product free from the extra number of steps of preventing contamination or rust can be obtained. In particular, when the solid lubricant layer 2 is left as it is, the solid lubricant forming step as the conventional post-step can be omitted, resulting in an economical advantage.

Examples of various industrial products mass-produced by lathing at low cost are listed as follows. An impeller used for a turbine, a blower, an axial fan, a centrifugal pump, or the rotary portion of a mixer is cast from titanium stocks, a solid lubricant layer 2 is formed on the outer surface of the impeller, and a mounting flange surface is obtained by lathing.

Valve parts of various valves, ship screws, and jet-ski impellers are cast from titanium stocks, solid lubricant layers are formed on these parts, and mounting hole portions are formed by lathing.

Other examples are products of near-net shapes formed by forging (precision forging, hot forging, cold forging, and warm forging) and casting (precision casting, lost wax casting, and centrifugal casting), and metal injection molding using sintered metals and ceramics.

Detailed examples are the rotation moment reduction and sound attenuation of rotating shafts of motors, bolt and nut parts exposed to sea water, brakes, clutch levers, and connecting rods of motor cycles and automobiles, and the like. Examples of sports goods are scuba diving tanks and regulators, underwater camera parts, mountain-climbing goods, ski goods, and fishing goods (reels and rod guides). Other examples are scaffolds, joints, pipes, bolts, and nuts. Further examples are the valves of storage/reaction tanks in chemical plants, bolts and nuts for electrolytic electrodes, ocean culture shells, tubular heat exchanger parts, artificial bones and joints for medical equipment, accessories against metal allergy, stationery, the rotors of turbo chargers of automobiles, and bolts, nuts, and engine parts for airplanes, and frames.

As many apparently widely different embodiments of the present invention can be made without departing from the spirit and scope thereof, it is to be understood that the invention is not limited to the specific embodiments thereof except as defined in the appended claims.

What is claimed is:

1. A round bar which is rotatably held to be fed in a longitudinal direction thereof by a guide bush fixed to a main body side of a lathing apparatus, and sequentially fed from the guide bush to a machining tool arranged on the main body side, thereby performing lathing of the round bar in a cantilevered state, said round bar having a solid lubricant layer having a predetermined thickness on an outer surface of the round bar in advance to reduce friction in a state of the round bar held by the guide bush, wherein said round bar contains a metal material selected from the group consisting of pure titanium and a titanium alloy and wherein said lubricant layer contains at least one paint selected from the group consisting of a fluoroplastic paint, a molybdenum disulfide paint, a tungsten disulphide paint, a graphite paint, a boron nitride paint, a polyimide paint, a polyamide paint, a PBI (polybenzoimidazole) paint, a silicone paint, a polysulfone paint, a polyether paint, and a polyether ketone paint, wherein said solid lubricant layer has a thickness of 1 to 100 microns, thereby preventing brittle fracture in the round bar held by said guide bush and making an outer diameter tolerance of the round bar fall within a general tolerance.

2. The round bar according to claim 1, wherein said solid lubricant layer is formed by sequentially performing a ground treatment step for the round bar, a step of painting said at least one paint, a preliminary drying step, a sintering step, and a cooling step.

3. The round bar according to claim 1, wherein said metal material of the round bar has a maximum thermal conductivity of 22 W/m·K.

4. A lathing stock which is gripped by a chuck of a lathe which performs turning or a lathing apparatus which performs any other machining in addition to the turning and lathing while an outer surface of said lathing stock is held to prevent an off-axis error, said lathing stock having a solid lubricant layer formed to have a predetermined thickness at a predetermined position where said solid lubricant layer is held and wherein said lathing stock contains a metal material selected from the group consisting of pure titanium and a titanium alloy, and said solid lubricant layer held in slidable contact with an off-axis error preventing device, so that the stock is lathed while preventing an off-axis error, wherein the lathing includes turning using a bite, thread cutting using a cutting drill, and cutting using a cutting device, and further includes a vertical end mill and/or a grinding device for performing grinding, for machining the stock held by said guide bush at a predetermined angle upon stopping rotating said chuck, thereby appropriately performing turning, thread cutting, cutting, and grinding, wherein said lubricant layer contains at least one paint selected from the group consisting of a fluoroplastic paint, a molybdenum disulfide paint, a tungsten disulfide paint, a graphite paint, a boron nitride paint, a polyimide paint, a polyamide paint, a PBI (polybenzoimidazole) paint, a silicone paint, a polysulfone paint, a polyether paint, and a polyether keytone paint, wherein said lubricant is formed by sequentially performing a ground treatment for the round bar, a step of painting said at least one paint, a preliminary drying step, a sintering step, and a cooling step, wherein said solid lubricant layer has a thickness of 1 to 100 microns, thereby said solid lubricant layer is held in slidable contact with an off-axis error preventing device, so that the stock is lathed while preventing an off-axis error.

5. The lathing stock according to claim 4, wherein said stock is a solid or hollow forged product, a precision-forged product, a hot-forged product, a cold-forged product, a warm-forged product, a cast product, a precision-cast product, a lost wax cast product, a centrifugal forged product, a metal injection-molded product, and a sintered metal product.

6. The lathing stock according to claim 4, wherein said stock comprises a main body made of a profile bar including a polygonal bar, a spline shaft, and a knurled shaft, said main body having a solid lubricant layer having a predetermined thickness on an outer surface thereof.

7. The lathing stock according to claim 4, wherein said metal material of the round bar has a maximum thermal conductivity of 22 W/m·K.

8. A lathed product obtained such that a round bar is rotatably held to be fed in a longitudinal direction thereof by a guide bush fixed to a main body side of a lathing apparatus, and the round bar is sequentially fed from the guide bush to a machining tool arranged on the main body side, thereby performing lathing of the round bar in a cantilevered state, wherein said round bar has a solid lubricant layer having a predetermined thickness on an outer surface thereof in advance and wherein said round bar contains a metal material selected from the group consisting of pure titanium and a titanium alloy, and the round bar lathed as to reduce friction in a region of the round bar held by the guide bush and the solid lubricant layer is partially left, wherein said lathing includes turning using a bite, thread cutting using a cutting drill, and cutting using a cutting device, and further includes a vertical end mill and/or a grinding device for performing grinding, for machining the stock held by said guide bush at a predetermined angle upon stopping rotating said chuck, thereby appropriately performing turning, thread cutting, cutting, and grinding, wherein said solid lubricant layer contains at least one paint selected from the group consisting of a fluoroplastic paint, a molybdenum disulfide paint, a tungsten disulfide paint, a graphite paint, a boron nitride paint, a polyimide paint, a polyamide paint, a PBI (polybenzoimidazole) paint, a silicone paint, a polysulfone paint, a polyether paint, and a polyether ether ketone paint, wherein a thickness of said solid lubricant layer is 1 $\mu$m to 100 $\mu$m, thereby preventing brittle fracture in the state of the round bar held by said guide bush and making an outer diameter tolerance of the round bar fall within a general tolerance.

9. The lathed product according to claim 8, wherein said solid lubricant layer is formed by sequentially performing a ground treatment step for the round bar, a step of painting said at least one paint, a preliminary drying step, a sintering step, and a cooling step.

10. The lathing stock according to claim 8, wherein said metal material of the round bar has a maximum thermal conductivity of 22 W/m·K.

* * * * *

UNITED STATES PATENT AND TRADEMARK OFFICE
CERTIFICATE OF CORRECTION

PATENT NO.    : 6,699,583 B1
DATED         : March 2, 2004
INVENTOR(S)   : Makoto Matsuo It is certified that error appears in the above-identified patent and that said Letters Patent is hereby corrected as shown below:

Column 3,
Line 62, change "contact-surfaces" to -- contact surfaces --.

Column 8,
Line 44, change "tightened-to" to -- tightened to --.

Column 10,
Line 40, "id" should be -- 1d --.

Column 14,
Line 1, "in" should be -- 1n --.

Column 15,
Line 51, after "wherein the lathing" insert -- , turning, or other machining --.
Lines 52 and 57, "and" should be -- or --.
Line 53, after "further includes" insert -- milling using --.
Line 53, "and/or" should be -- or grinding with --.
Line 54, delete "for performing grinding".
Line 55, "said" should be -- a --.
Line 65, "polyether keytone" should be -- polyether ether ketone --.

Column 16,
Lines 13 and 37, "and" should be -- or --.
Line 33, after "round bar" insert -- so --.
Line 35, after "left" and before the comma, insert -- on the round bar --.
Line 36, after "wherein said lathing" insert -- turning, or other machining --.

UNITED STATES PATENT AND TRADEMARK OFFICE
CERTIFICATE OF CORRECTION

PATENT NO. : 6,699,583 B1
DATED : March 2, 2004
INVENTOR(S) : Makoto Matsuo

It is certified that error appears in the above-identified patent and that said Letters Patent is hereby corrected as shown below:

<u>Column 16 (cont'd),</u>
Line 38, after "includes" insert -- milling using --.
Line 38, change "and/or" to -- or grinding with --.
Line 39, delete "performing grinding for".
Line 40, change "stock" to -- round bar --.

Signed and Sealed this

Sixteenth Day of May, 2006

JON W. DUDAS
*Director of the United States Patent and Trademark Office*